Oct. 28, 1958     R. A. LOFMAN     2,858,393
BAROMETRIC ALARM
Filed July 18, 1956     2 Sheets-Sheet 2
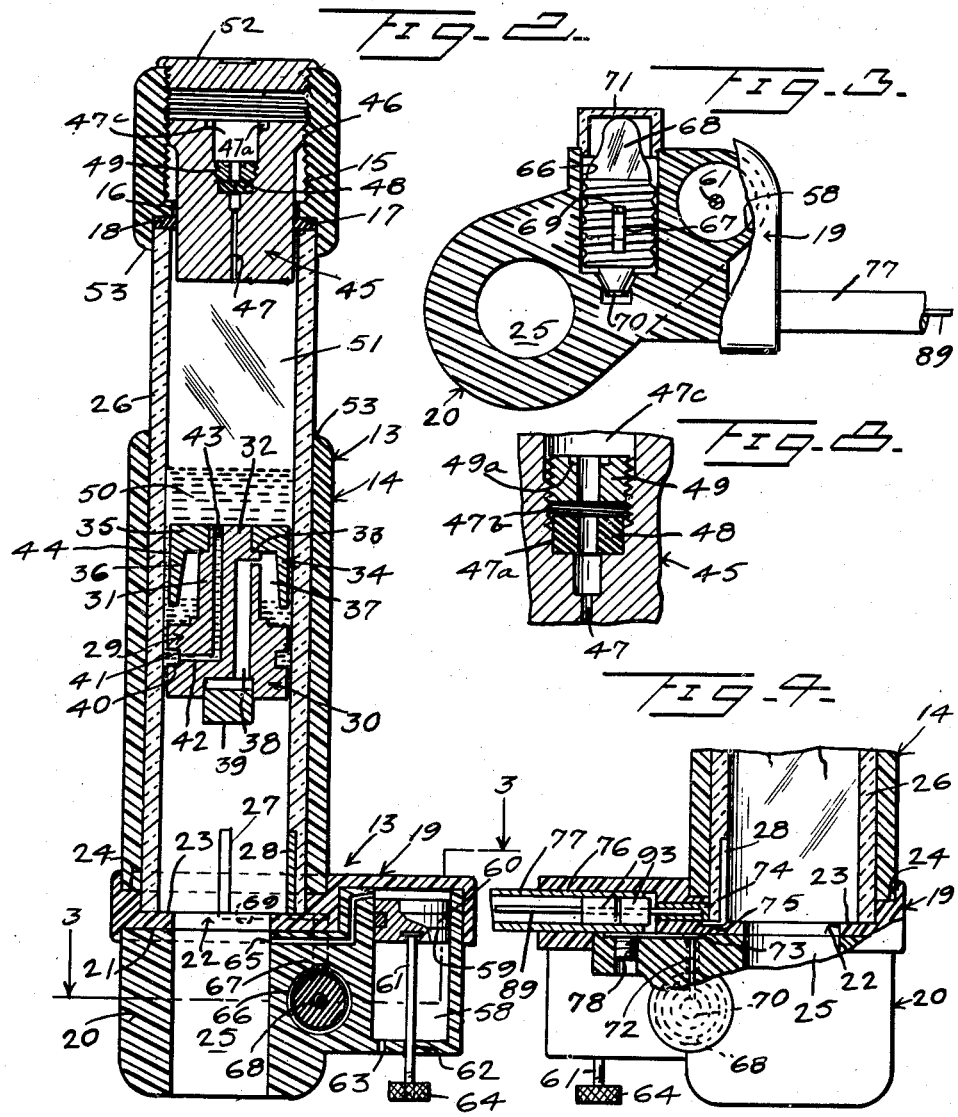
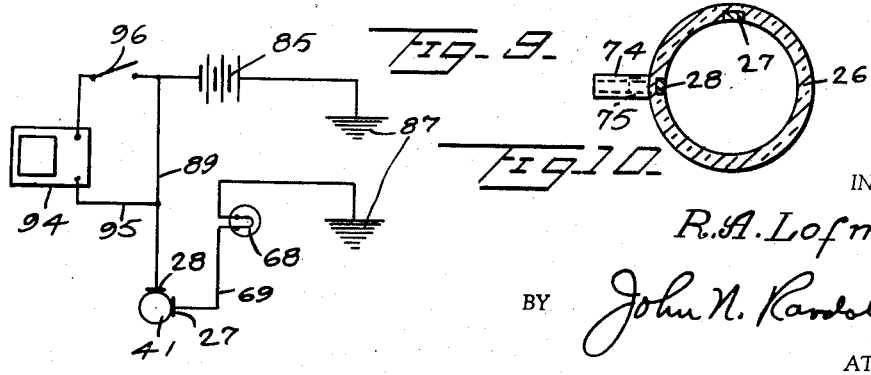
INVENTOR
R. A. Lofman
BY John N. Randolph
ATTORNEY

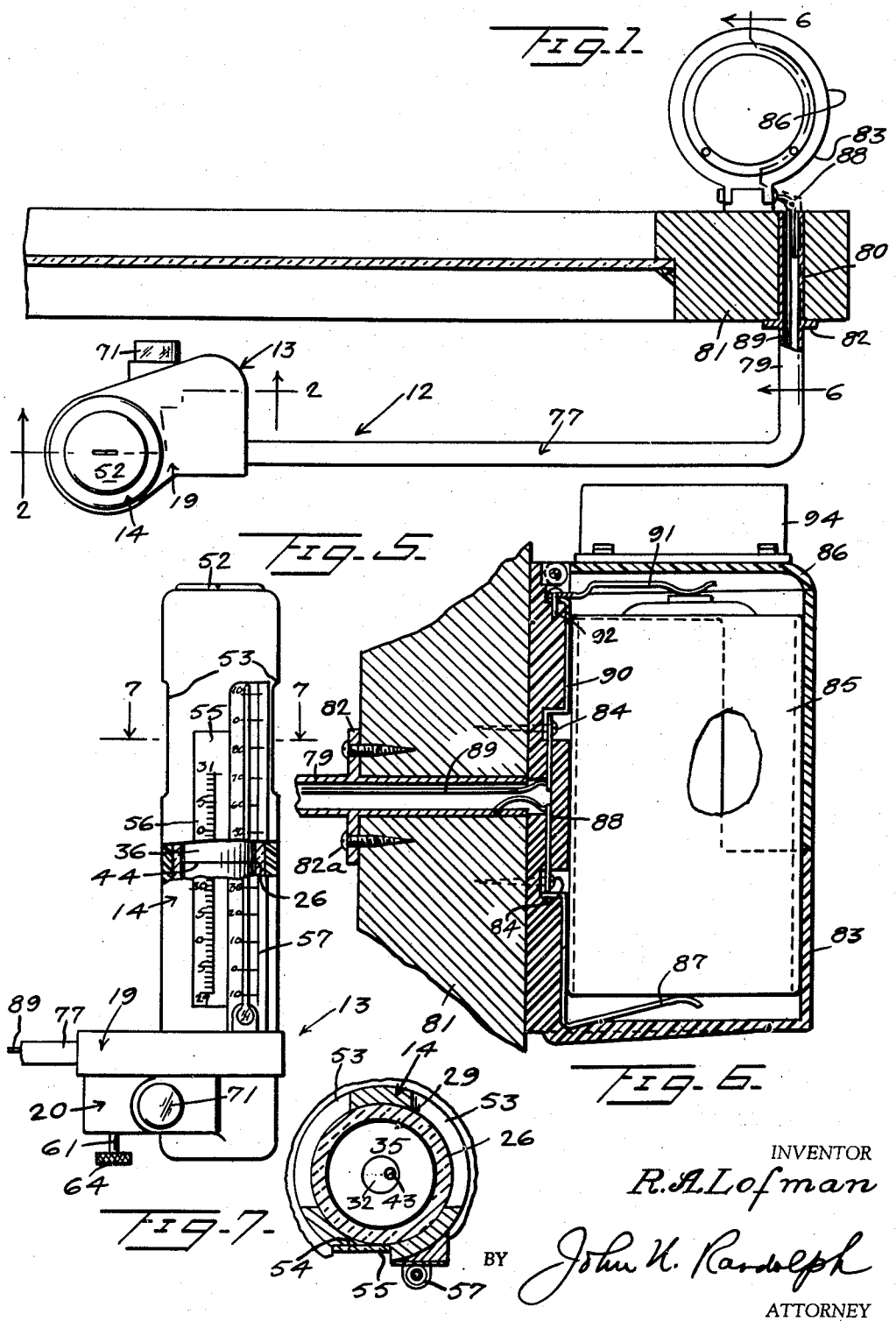

United States Patent Office 2,858,393
Patented Oct. 28, 1958

2,858,393
BAROMETRIC ALARM
Robert A. Lofman, Madison, Ohio

Application July 18, 1956, Serial No. 598,617

10 Claims. (Cl. 200—82)

This invention relates to a novel alarm or warning device for indicating the approach of a tornado or other violent storm of a type capable of causing a substantial lowering of the barometric pressure.

The warnings broadcast by the weather bureau in reference to tornadoes and other violent storms covers such large areas that it is not sufficiently definite to afford the type of warning needed by residents of sparsely populated areas. Accordingly, such persons frequently are compelled to wait until a tornado or other violent storm actually strikes their locality before safety precautions can be taken. This is especially dangerous during the hours of darkness when a tornado or violent storm cannot be seen in advance and its presence is unknown until the tornado has struck.

Accordingly, it is a primary object of the present invention to provide an instrument which will supply an alarm either audible, visible or both to warn of the approach of a tornado or other violent storm in ample time so that proper precautionary measures can be taken for protection of life and property.

A further object of the invention is to provide an instrument of the aforedescribed character of extremely simple construction which may be economically manufactured and sold and which may thus be made readily available to prospective users.

A further object of the invention is to provide such an instrument having means enabling an accurate testing of the instrument to determine whether of not it is in condition to function.

Still a further object of the invention is to provide such an instrument which may be very easily adjusted so that accurate barometric readings can be obtained therefrom and so that the alarm system thereof will be rendered operative upon a predetermined lowering of the barometric pressure.

Various other objects and advantages of the invention will hereinafter become more fully apparent from the following description of the drawings, illustrating a presently preferred embodiment thereof, and wherein:

Figure 1 is a top plan view, partly in horziontal section, showing the barometric alarm in an applied position;

Figure 2 is an enlarged vertical sectional view thereof, taken substantially along a plane as indicated by the line 2—2 of Figure 1;

Figure 3 is a horizontal sectional view, taken substantially along a plane as indicated by the line 3—3 of Figure 2;

Figure 4 is a fragmentary front elevational view, partly in vertical section of the front portion of a part of the instrument;

Figure 5 is a front elevational view of the instrument on a scale corresponding to the scale of Figure 1;

Figure 6 is an enlarged fragmentary vertical sectional view, taken substantially along a plane as indicated by the line 6—6 of Figure 1;

Figure 7 is an enlarged horizontal sectional view, taken substantially along a plane as indicated by the line 7—7 of Figure 5;

Figure 8 is an enlarged fragmentary central vertical sectional view of a part of the instrument as seen in Figure 2 and illustrating a different position of certain of the parts;

Figure 9 is a diagrammatic view of the electric circuit of the instrument, and

Figure 10 is a fragmentary horizontal sectional view illustrating certain of the parts of the instrument in detail.

Referring more specifically to the drawings, the barometric instrument in its entirety and comprising the invention is designated generally 12 and includes an elongated upright housing, designated generally 13 and which is preferably formed of an opaque plastic.

The housing 13 includes an elongated upper section 14 which is in the form of a sleeve, as best seen in Figure 2, and which includes a somewhat restricted internally threaded upper end portion 15. The housing section 14 has an internal annular restriction 16 directly below the internally threaded portion 15, the underside of which defines a downwardly facing annular shoulder 17 against which an annular sealing gasket 18, preferably formed of rubber, seats. The gasket 18 has an inner diameter smaller than the inner diameter of the restriction 16. The housing 13 also includes an upper base section 19 and a lower base section 20. The underside of the base section 19 is recessed to receive the upper portion of the base section 20, as best seen at 21 in Figure 2. The upper base section 19 is provided with an opening 22 the upper portion of which is stepped to define upwardly facing annular steps or shoulders 23 and 24. The lower base section 20 has an opening 25 extending vertically therethrough, the upper end of which registers with the lower portion of the opening 22 and is of a diameter corresponding to the diameter thereof.

A glass tube 26 which is transparent fits snugly in the housing section 14 and has an upper end seating against the gasket 18. The lower end of the housing section 14 is disposed in the upper enlarged portion of the opening 22 and seats on the upper shoulder 24 and is of a thickness corresponding to the radial width of said shoulder. The lower end of the cylinder 26 seats on the outer portion of the lower shoulder 23, which shoulder is of a radial width substantially greater than the thickness of said cylinder so that the annular inner portion of the shoulder 23 is exposed and faces upwardly into the cylinder 26, and so that the lower restricted portion of the opening 22 is of a diameter less than the bore diameter of said cylinder 26. A pair of electrical conductor strips 27 and 28 are embedded longitudinally in the lower portion of the cylinder 26 in circumferentially spaced relation to one another and extend upwardly a short distance from the lower end of said cylinder 26 and have inner surfaces disposed flush with the bore of the cylinder 26.

A piston, designated generally 29, slidably engages in the cylinder 26 and includes a lower section 30 having a restricted upwardly extending central portion 31 the upper part of which is further restricted as seen at 32 to define an annular upwardly facing shoulder 33. The upper piston section 34, which is of the same diameter as the lower section 30, includes an annular upper part 35 which fits snugly around the part 32 and which rests upon the shoulder 33 for supporting the upper piston section 34 on the central column 31. The upper piston section 34 also includes an annular depending skirt 36 which extends downwardly from the outer part of the head portion 35. The skirt 36 is radially spaced from the column 31, has an outer diameter corresponding to that of the piston portions 30 and 35, and terminates above and spaced from the lower part of the lower piston section 30. The skirt 36 combines with a portion of the column 31 surrounded thereby to form an annular downwardly opening chamber 37. An air passage 38 extends longitudinally of the lower piston section 30 and has an upper end opening laterally into the upper portion of the annular chamber 37 and an enlarged open lower end which is closed and sealed by a metal plug 39. The enlarged lower portion of the lower piston section 30 is provided with an annular outwardly opening groove 40 which is filled with mercury 41 through a filling passage 42. The passage 42 extends radially inward from a part of the groove 40 and thence upward through the piston parts 31 and 32 and the open upper end thereof is sealed by a plug 43, after the groove and passage have been filled with mercury. The piston 29 is preferably composed of clear plastic and the upper section 34 thereof has a luminous die added. A hairline 44 is inscribed in and encircles the apron 36, approximately midway of the upper and lower ends of the upper section 34, so that said hairline will be visible in the dark. The actual clearance between the piston sections and the bore of the cylinder 26 has been exaggerated in the drawings. This clearance will be between .003 and .005 of an inch.

The mercury 41 is applied after the assembled piston is in the cylinder 26 and provides a seal between the piston and cylinder which will prevent air or liquid from bypassing the piston.

A piston adjusting plug or plunger 45 extends downwardly through the internal restriction 16 and gasket 18 and combines with said gasket to seal the upper end of the cylinder 26, as will hereinafter be described. The plunger 45 has an externally enlarged and threaded upper portion 46 which threadedly engages the threaded bore portion 15 for adjustably positioning the lower end of said plunger in the upper portion of the cylinder 26. A bore 47 having a lower portion of small diameter extends longitudinally through the plunger 45. As best seen in Figures 2 and 8, an annular compressible sealing washer 48, having a central bore of small diameter fits snugly in an enlarged part 47a of the bore 47 beneath an annular plug 49 which is threaded into a bore portion 47b. The upper bore portion 47c of largest diameter and which opens outwardly of the upper end of the plunger 45 is notched to provide a screw driver kerf 47d by which the plunger 45 can be threaded upwardly or downwardly in the bore portion 15 by application of a screw driver thereto. The plug 49 is provided with a screw driver kerf 49a in its upper end, as best seen in Figure 8.

After the piston 29 is in the cylinder 26 and the upper end of said cylinder has the lower portion of the plunger 45 disposed therein, with the plug 49 backed off as seen in Figure 8, a liquid is supplied to the upper portion of the cylinder through the aligned bores of the plug 49 and washer 48 and through the bore 47 disposed therebeneath. This liquid, which may be water or a mixture of water and glycerin, to prevent freezing thereof, will be prevented from bypassing the piston by the mercury ring 41 but will bypass the upper piston section 34 so as to seal the lower end of the chamber 37 to prevent escape of air therefrom. The liquid 50 will extend to a level of one quarter to three eighths of an inch above the piston 29. An inert gas such as helium is supplied to the chamber 51 of the cylinder 26, between the plunger 45 and the liquid 50, through the same passage as said liquid and after the liquid has been supplied, after which the plug 49 is advanced downwardly to compress the washer 48 for closing and sealing the bore of said washer, as seen in Figure 2. A plug 52 is then threaded into the open upper end of the housing bore 15.

The upper housing section 14 is provided with a pair of openings 53 through which parts of the upper portion of the cylinder 26 are exposed. The front of the housing section 14 is provided with a longitudinally extending opening 54, as best seen in Figure 7, in which a strip of transparent material 55 is secured. Said strip 55 contains graduations and markings 56, as seen in Figure 5, so that the strip 55 forms a transparent barometric gauge strip through which the hairline 44 of the piston is visible in daylight or darkness and can be read in relation to the graduations and markings 56. A conventional thermometer 57 is molded to the front portion of the housing section 14 on one side of the gauge strip 55.

A cylinder 58, as best seen in Figure 2, is formed in the lower base section 20 and the upper end thereof is closed by a part of the upper base section 19. A piston 59 having a sealing ring 60 is slidably mounted in the cylinder 58 and has a rod 61 extending downwardly therefrom slidably through an opening 62 in a part of the base section 20 which is disposed below the cylinder 58 and which portion also includes a vent opening 63. A knob 64 is detachably secured to the lower end of the rod 61, beneath the opening 62. A passage 65 is formed in the base section 20 and connects the upper portion of the bore 25 to the upper part of the cylinder 58. The piston 29 is supported in a raised position within the cylinder 26 by atmospheric pressure since the lower end of said cylinder communicates with the atmosphere through the opening 22 and bore 25. To test the electric circuit which will hereinafter be described and which includes the two conductor strips 27 and 28 and the mercury ring 41, the lower end of the bore 25 can be sealed by placing the thumb thereover. The piston 59 is then displaced downwardly to create a suction in the upper part of the cylinder 58 for drawing the air thereto from the lower part of the cylinder 26 through the passage 65, so that the piston 29 can move downwardly until the mercury ring 41, which forms an electrical conductor, bridges the gap between the contact strips 27 and 28 for closing a circuit therebetween to the alarm, hereinafter to be described, to thus enable the instrument 12 to be tested to determine whether the alarm portion thereof is operative. The piston 59 is returned to the position adjacent the upper end of the cylinder 58 after the aforedescribed test has been completed.

The base section 20 is provided with a socket 66 which opens outwardly of the forward side thereof. A contact strip 67 is mounted in and protrudes from a part of the wall of the socket 66, as seen in Figures 2 and 3, to engage the side contact of a light bulb 68 which is slidably mounted removably in the socket 66. A conductor strip 69 extends between and electrically connects the contact strip 67 to the contact strip 27. A contact strip 70 is mounted in the inner end of the socket 66 and is engaged by the base end of the lamp bulb 68. A lens 71 closes the open front of the socket 66 and bears against the forward end of the bulb 68 to maintain the base end thereof in engagement with the contact 70. The lens 71 is preferably formed of transparent plastic and is colored red and constitutes a finger pressure snap lens. A conductor strip 72 connects with and extends upwardly from the base contact 70 and is disposed in engagement with an end portion of a conductor strip 73, as seen in Figure 4. A sleeve 74 of electrical conducting material has an inner end opening into a portion of the opening 22 which is located immediately above the shoulder 23, and which thus bears against a part of the lower end of the cylinder 26. A conductor strip 75 forming an extension of the contact 28, extends therefrom and connects with the sleeve 74. The opposite end of the sleeve 74 extends into the inner end of a bore 76 which is formed in the upper base section 19 and which is disposed normal to the axis of the housing 13. One end of a rigid tubular arm 77, which is formed of an electrical conducting material, extends into the bore 76 through the opposite open end thereof and contacts the opposite end of the strip 73 which is exposed in a part of the wall of said bore 76 for electrically connecting the base contact 70 to the arm 77. A setscrew 78 is threadedly mounted in a part of the base section 20 and bears against the strip 73 to secure it against the tubular arm 77 and to clamp said tubular arm in the bore 76.

In the embodiment of the invention as disclosed, the arm 77 has a right angularly bent opposite end portion 79 a part of which extends inwardly through an opening 80 of a window frame 81. The arm portion 79 is provided with an attaching flange 82, as seen in Figure 6, which is adapted to bear against the outer side of the window frame 81 to be secured thereto by fastenings 82a. However, it will be understood that the arm 77 may be of various shapes depending upon where it is desired to mount the housing 13. As illustrated in Figure 1, the housing 13 is disposed on the outer side of the window 81, visible therethrough.

A battery case 83 is mounted on the inner side of the window frame 81 by fastenings 84, so that the battery case 83 will be accessible from within a dwelling or other building of which the window 81 forms a part. The battery case 83 contains a source of electric current, such as a conventional dry cell battery 85. The battery case 83 has a hinged lid 86 affording access to the upper end of the case for replacing the battery 85. A conductor strip 87 has one end bearing against the base end of the battery 85 and an opposite end connected to one of the fastenings 84. An exposed end of a conductor wire 88 is connected by said fastening 84 to the conductor strip 87 and the other exposed end of the wire 88 is electrically connected to the tubular metal arm 77. An exposed end of a covered conductor wire 89 is connected to one end of a conductor strip 90 by the other fastening 84. The opposite end of the conductor strip 90 is electrically connected to one end of a spring conductor strip 91 by a fastening 92 which is mounted vertically in a portion of the case 83. The strip 91 is thus supported for swinging movement and in one position, as seen in Figure 6, bears on the other forward contact of the battery 85. The conductor strip 91 is swingable horizontally away from a position over the battery 85 when the cover 86 is moved to a raised position, so as not to provide an obstruction to removal and replacement of the battery 85. The conductor wire 89 extends longitudinally through the tubular arm 77 and the opposite exposed end thereof engages in the conductor sleeve 74 and is electrically connected thereby and by the strip 75 to the strip 28. Insulator elements 93 may be mounted on the conductor 89 within the arm 77 adjacent the sleeve 74 to insure that the wire 89 will be insulated from the arm 77. If desired, an audible signal such as a buzzer 94 may be interposed in the electric circuit of the current source 85 and light source 68 by an auxiliary circuit 95, as illustrated diagrammatically in Figure 9, and which auxiliary circuit may include a manual switch 96. The audible signal or buzzer 94, as shown in Figure 6, may be mounted in any convenient location within the building of which the window 81 forms a part so that with the switch 96 closed both the audible and visual signals will be energized when the mercury bridge 41 engages the contact strips 27 and 28.

When the barometric pressure falls to a point only slightly above a reading of 28.50 inches, the piston 29 will move downwardly in the cylinder 26 sufficiently so that the mercury ring 41 will bridge the contact strips 27 and 28 for energizing the signal 68 or the signals 68 and 94 to warn of the approach of a tornado or violent storm and so that proper precautionary measures can be taken. The instrument 12 mounted as illustrated in Figure 1 can be viewed through the pane of the window 81 so that the barometric reading can be observed at any time and likewise the temperature on the thermometer 57. The bottom of the cylinder 26 is open to the atmosphere through the opening 22 and bore 25 so that atmospheric pressure bears directly against the lower end of the piston 29 for supporting the piston within the cylinder 26 at a level so that the position of the hairline 44 when read in conjunction with the graduations 56 will indicate the barometric pressure. The mercury ring 41 in addition to constituting a conductor bridge between the electrical contacts 27 and 28 also acts as a seal to prevent the liquid 50 from escaping downwardly past said mercury ring and to prevent evaporation of the liquid, and the mercury also exerts enough pressure against the inner wall of the cylinder 26 to prevent air from bypassing the piston 29. The metal plug 39 conducts temperature changes readily to air trapped in the chamber 37 to effect expansion and contraction of this trapped air, the changing volume of which along with the expansion and contraction of the helium or other inert gas in the chamber 51 resulting from temperature changes, causes the instrument 12 to function very accurately as a barometer. The helium in the chamber 51 being inert and more stable than air and above the liquid 50, has approximately six times the thermoconductivity of air and produces about three times as much movement of the piston 29 as would be produced if the chamber 51 contained air.

In initially placing the instrument 12 in use, after the saturation point of the helium in the chamber 51 above the liquid 50 is reached, no more measurable evaporation will occur and the instrument is then set to an accurate reading with a mercury barometer by turning the plunger 45 to move it either upwardly or downwardly to effect movement of the piston 29 in the cylinder 26 until a correct reading can be obtained by the hairline 44 and the barometric graduations 56.

The openings 53 provide for visual inspection and are especially useful when the mercury 41 is being applied to the piston. Additionally, the portion of the cylinder 26 exposed by the openings 53 provides a good conductor of heat and cold to the chamber 51 containing the helium gas.

Various modifications and changes are contemplated and may obviously be resorted to, without departing from the spirit or scope of the invention as hereinafter defined by the appended claims.

I claim as my invention:

1. A barometric alarm comprising an elongated housing, means supporting said housing in substantially an upright position, a cylinder contained in said housing and disposed longitudinally thereof, said cylinder being formed of an electrical insulating material, a piston slidably mounted in said cylinder, said housing having an opening communicating with the atmosphere and opening into the lower end of said cylinder whereby said piston is supported within the cylinder by atmospheric pressure, means sealing the upper end of said cylinder, a liquid partially filling the upper portion of said cylinder and supported therein by the piston, said liquid combining with said sealing means to form a chamber in the upper portion of said cylinder containing helium, said piston having a sealing ring formed of electrical conducting material to prevent the liquid from escaping downwardly past the piston and to prevent air escaping upwardly past the piston, a pair of strip contacts of electrical conducting material embedded in said cylinder longitudinally thereof and in circumferentially spaced relation to one another and located adjacent the lower end of said cylinder to be engaged by said sealing ring as the piston approaches the lower end of the cylinder for electrically connecting said contact strips, said contact strips and sealing ring forming an electric switch adapted to be interposed in an electric circuit for closing the electric circuit when said sealing ring is in engagement with the contact strips and for breaking the electric circuit when the sealing ring is out of engagement with the contact strips.

2. A barometric alarm as in claim 1, said sealing ring comprising mercury, said piston having an outwardly opening groove in the periphery thereof containing the mercury.

3. A barometric alarm as in claim 2, said piston having a passage opening outwardly of the upper end thereof and communicating with said groove for filling the groove with mercury and for containing additional mercury.

4. A barometric alarm as in claim 3, said piston having a downwardly opening annular air chamber disposed above the mercury ring and adapted to be sealed by the liquid contained in the cylinder above the mercury ring, and means forming a part of said piston communicating with said air chamber and exposed to atmospheric pressure at the lower end of said piston to effect expansion and contraction of the air in said chamber in response to temperature variations in the air contained in the cylinder beneath the piston.

5. A barometric alarm as in claim 1, said cylinder being formed of a transparent material, said housing including an elongated transparent portion through which the piston contained in the cylinder is visible, said transparent portion containing graduations and markings forming a barometric scale, and said piston having a hairline visible through said transparent housing portion and disposed behind the graduations of said scale.

6. A barometric alarm as in claim 5, a portion of the piston in which said hairline is formed being composed of a luminous material whereby the position of said hairline relative to the barometric scale is visible in darkness.

7. A barometric alarm as in claim 1, said means for sealing the upper end of the cylinder including a plunger, and means adjustably mounting said plunger for displacement of the plunger inwardly of and outwardly of the cylinder to effect a movement of the piston relative to the cylinder for adjusting the position of the piston therein with respect to a given atmospheric pressure by which the piston is supported.

8. A barometric alarm as in claim 7, a passage extending through said plunger for filling the cylinder above the piston with the liquid and gas, and means for sealing said passage for sealing the upper end of the cylinder.

9. A barometric alarm as in claim 1, a manually actuated means for evacuating the air from the cylinder beneath the piston to cause the piston to move downwardly to position the sealing ring thereof in engagement with the contact strips for testing the electric circuit.

10. A barometric alarm as in claim 1, said housing including openings exposing a part of the upper portion of said cylinder, said cylinder being formed of glass and being transparent to provide a good conductor of heat and cold from the ambient atmosphere surrounding the housing to the chamber of the cylinder containing the inert helium, and said housing openings combining with the cylinder portions exposed thereby to form inspection windows.

References Cited in the file of this patent

UNITED STATES PATENTS

| | | |
|---|---|---|
| 2,461,075 | Naylor | Feb. 8, 1949 |
| 2,723,388 | Jacobs | Nov. 8, 1955 |